United States Patent [19]

Gabel et al.

[11] Patent Number: 4,796,703
[45] Date of Patent: Jan. 10, 1989

[54] COMPOSITIONS FOR AGGLOMERATING SOLID CONTAMINANTS IN WELL FLUIDS AND METHODS FOR USING SAME

[75] Inventors: Robert K. Gabel; Robert E. Law, both of Houston, Tex.

[73] Assignee: Nalco Chemical Company, Naperville, Ill.

[21] Appl. No.: 86,060

[22] Filed: Aug. 17, 1987

[51] Int. Cl.$^4$ .................. E21B 37/00; E21B 43/00
[52] U.S. Cl. .................................. 166/312; 166/291; 252/8.551
[58] Field of Search .............. 210/728, 729; 166/312, 166/291

[56] References Cited

U.S. PATENT DOCUMENTS

| | | |
|---|---|---|
| 2,089,212 | 8/1937 | Kritchevsky ............ 252/357 X |
| 2,094,609 | 10/1937 | Kritchevsky ............ 252/357 X |
| 2,598,213 | 5/1952 | Blair ....................... 252/8.555 |
| 2,873,253 | 2/1959 | Stanphill . |
| 3,086,938 | 4/1963 | Means et al. . |
| 3,737,037 | 6/1973 | Bone, III . |
| 4,032,460 | 6/1977 | Zilch et al. . |
| 4,127,482 | 11/1978 | Watson et al. . |
| 4,218,316 | 8/1980 | Watson et al. . |
| 4,233,162 | 11/1980 | Carney . |
| 4,451,377 | 5/1984 | Luxemburg . |
| 4,453,598 | 6/1984 | Singer et al. . |
| 4,456,537 | 6/1984 | Oliver, Jr. et al. . |
| 4,474,240 | 10/1984 | Oliver, Jr. et al. . |
| 4,515,699 | 5/1985 | Oliver, Jr. et al. . |

*Primary Examiner*—Herbert B. Guynn
*Attorney, Agent, or Firm*—Sheridan, Ross & McIntosh

[57] ABSTRACT

A composition for use in agglomerating and removing solid contaminants in well fluids is disclosed. The composition comprises a carrier and the amide/glyceride reaction product obtained by heating a secondary amine in the presence of a fat or oil. The composition is used in processes to agglomerate the solids in contaminated well fluid and in which the agent is diluted and used as a preflush prior to replacing drilling mud with fresh well fluid.

22 Claims, No Drawings

COMPOSITIONS FOR AGGLOMERATING SOLID CONTAMINANTS IN WELL FLUIDS AND METHODS FOR USING SAME

FIELD OF THE INVENTION

This invention relates generally to a composition useful an an agglomerating agent for removing contaminants from well fluids and also as a preflush for cleansing well-bores and well equipment, and to a process for removing solid contaminants from well fluid.

BACKGROUND OF THE INVENTION

In drilling and servicing wells, various well fluids are usually employed, for example, drilling mud. The drilling mud is pumped down a string of tubing to which is attached a drill bit. The drill bit is provided with openings above the cutting edge through which the mud passes outwardly and returns to the surface by way of the annulus formed by the string of drill tubing and the well bore wall or casing where the well has been provided with casing. The drilling mud serves a number of functions including: carrying the cuttings of the drill bit to the surface; plastering the well bore to prevent sloughing of earthen materials from the bore; and, providing a weighting fluid in the well bore.

Upon completion of the drilling, the drilling mud is removed from the well by circulation or swabbing. Typically it is replaced by completion or packing fluid. The replacement of the drilling mud by the completion or packing fluid is usually accomplished by first injecting a preflush into the well. The preflush forces the drilling mud out and at the same time cleans the well of mud residue. The preflush is then followed by an injection of a completion or packing fluid which in many instances comprises a high density aqueous brine. Typically these brines contain high concentrations of sodium bromide, sodium chloride, calcium bromide, calcium chloride, zinc bromide, zinc chloride or mixtures thereof. These aqueous brines typically have densities in the range from about 8 to about 19 pounds per gallon.

The aqueous brine should be free of solid contaminants. Solids in a completion fluid can cause serious injury to a producing formation by plugging the pore spaces therein or even by plugging the perforations and channels provided to induce fluid flows between the formation and the well bore. If there are solids in a packer fluid, in time the solids can precipitate and settle upon the packer. Such solids deposits make it difficult to disconnect the tubing from the packer resulting in a costly well workover.

Although it is desirable to have an aqueous brine that is free of solid contaminants, it is difficult to keep the brine contaminant-free. Solid contaminants can be introduced into the brine prior to its injection into the well and during the actual injection process. Although it is possible to manufacture the brine at the well site, it is difficult to do so because of the extremely high concentrations of salt. Therefore, the brine is typically manufactured and transported to the well site. This means that solid contaminants can enter the aqueous brine when it is being stored at the manufacturing site, when it is transferred to the vehicle (e.g., the truck or boat) in which it is transported to the well site, and when it is transferred into the well site storage facility prior to injection into the well.

The brine can also become contaminated when it is injected into the well. The pumping equipment used to inject the brine can have solid contaminants remaining therein in spite of a preflush step. Also, the drilling mud tends to form a filter cake on the wall of the well bore which will then contaminate injected brine. The presence of this filter cake is undesirable when a cement slurry is injected into the annulus between the well tubing and the well bore wall. The purpose of the cement slurry is to bond the tubing to the walls of the well bore. This purpose is frustrated if a filter cake is present because the cement may not adhere to the walls of the well bore because this filter cake provides a poor adhesive surface. Therefore, it is desirable to remove as much of the filter cake and other solid contaminants from the well system as possible in the preflush step.

The prior art has dealt with contaminants in fluids in a number of ways. For example, U.S. Pat. No. 4,451,377 issued May 29, 1984 to S. R. Luxemburg, U.S. Pat. No. 4,218,316 issued Aug. 19, 1980, to J. L. Watson et al., U.S. Pat. No. 4,127,482 issued Nov. 28, 1978, to J. L. Watson et al., and U.S. Pat. No. 3,737,037 issued June 5, 1973, to L. Bone III, all disclose the use of polymeric flocculating agents to clean oil contaminated fluids or to flocculate solids in contaminated water. In general these patents disclose a process whereby a polymeric flocculant is added to a contaminated fluid. Flocs then form from the contaminants and are removed.

In order for the flocculating agents to function, there must be a charge associated with the contaminant particles. However, in a highly concentrated brine, charge-charge interactions cannot be used to effect the contaminant removal because the available particulate surface charge is essentially zero. This is because the electrical double layer is extremely compressed due to the high ionic strength of the brine solution. Furthermore, flocculation by known flocculating agents, such as polyacrylamide and polyethylene oxide, is difficult because these polymers are not readily soluble in concentrated brine.

A successful procedure for removing solid contaminants from aqueous brine uses an agglomeration agent. In U.S. Pat. No. 4,515,699 issued May 7, 1985, to Oliver, Jr. et al. and U.S. Pat. No. 4,456,537 issued June 26, 1984 to Oliver, Jr., et al. a process is disclosed for removing solid contaminants from brine using an aliphatic alcohol and a surfactant. The surfactant is selected from the group consisting of amines, amides and aliphatic amine oxides. The preferred surfactant is reported to be the amide reaction product of diethanolamine and an organic fatty monobasic acid of the general formula $C_nH_{2n+1}COOH$, where n is 12 to 18.

An advantage of the type of agglomerating agents disclosed in U.S. Pat. Nos. 4,515,699 and 4,456,537 is that they are not only useful for removing solid contaminants from aqueous brine, but also can successfully function as a preflush. In U.S. Pat. No. 4,453,598 issued June 12, 1984, to Singer et al. and U.S. Pat. No. 4,474,240 issued Oct. 2, 1984, to Oliver, Jr. et al., it is taught that the same agglomerating agents disclosed in U.S. Pat. Nos. 4,515,699 and 4,456,537 can also successfully function as preflush agents. That is, they can be diluted and used to flush out drilling muds prior to injecting solids-free aqueous brines or other well fluids.

However, the surfactants disclosed in these patents suffer from a number of disadvantages. First, because the starting materials are preferably pure acids, the manufacturing costs of the compositions are high. Second, when prepared in the way disclosed in U.S. Pat.

Nos. 4,515,699, 4,456,537, 4,453,598 and 4,474,240 these surfactants contain not only amides but also acid/amine salts. It has now been found that this can lead to poor agglomeration. In fact, in some cases the compositions actually disperse solids rather than agglomerating them. And third, it is preferable to have a surfactant in which the concentration of amides is higher than that attained in the surfactants disclosed in these patents.

In summary, the prior art agglomerating agents are expensive to produce and their effectiveness can be unsatisfactory. In addition, in some cases they have been found to disperse, rather than agglomerate, solid contaminants. Therefore, it would be advantageous to have agglomerating agents that are relatively simple and inexpensive to produce, and yet perform as well or better than prior art agents. It has now been found that these disadvantages can be minimized by the instant invention.

SUMMARY OF THE INVENTION

The present invention involves a composition capable of providing improved agglomeration of solid contaminants in well fluids. This agglomerating agent comprises an effective amount of a surfactant comprising reaction products of a secondary amine and fats, oils, or mixtures thereof. This surfactant comprises amides and glycerides. The remainder of the composition comprises a carrier which is insoluble in said well fluid and which is capable of forming a solution with the surfactant.

In a further embodiment, the instant invention involves a process for removing solid contaminants from a well fluid. The process comprises adding the composition described above to a well fluid containing solid contaminants, allowing the contaminants to agglomerate, and removing the agglomerates.

In another embodiment, a process is provided for eliminating drilling mud solids and oil in the well system prior to introduction of a well fluid such as a cement slurry or solids-free aqueous brine. This process comprises first displacing drilling mud from the well system by circulating in the well system a first portion of clean water until most of the drilling mud is removed from the well system and carried in the first portion of clean water. Next a treated water mixture is prepared by mixing the composition described above with a second portion of clean water. The treated water mixture is then circulated through the surface equipment and the well bore equipment of the well system to displace the first portion of clean water carrying drilling mud from the well system. The circulation of the treated water mixture in the well system continues until substantially all the drilling mud is suspended in the circulated treated water mixture. The treated water mixture is displaced from the well system to a suitable disposal region, with a third portion of solids-free clean water, preferably without interruption of circulation to the well system. Finally, the third portion of clean water is displaced from the well system with fresh well fluid in the parts of the well system receiving the fresh well fluid.

DETAILED DESCRIPTION OF THE INVENTION

The composition of the present invention contains a surfactant and a carrier for the surfactant. The surfactant of the instant invention comprises amides and glycerides. It is prepared by heating fats, oils or mixtures thereof in the presence of one or more secondary amines. The instant carrier is a material which forms a solution with the surfactant but is insoluble in the liquid to be decontaminated. The surfactant is preferably present in a range from about 10 to about 50 percent by weight, more preferably from about 20 to about 50 percent by weight, and most preferably from about 35 to about 45 percent by weight, relative to the total weight of the composition. The carrier is preferably present in an amount ranging from about 50 to about 80 percent by weight, relative to the total weight of the composition.

This composition provides a number of advantages over the prior art. First, the reaction products of the present method of surfactant preparation are amides and glycerides rather than the amides and acid/amine salts which are formed when a carboxylic acid is reacted with a secondary amine. This is beneficial because the glycerides act to oil wet the solid contaminant particles and promote agglomeration. Acid/amine salts found in prior art compositions are, in some instances, believed to cause dispersion of solid contaminants rather than agglomeration. Second, the present reaction forms an unexpectedly high concentration of amides, which also promote agglomeration. Third, the cost of manufacturing is low because the starting material is a fat or oil, rather than a relatively expensive carboxylic acid.

In preparation of the instant surfactant, triglycerides in the form of fats and oils are reacted with secondary amines to form amides and glycerides. The secondary amine and fat or oil reactants are heated to temperatures in the range of about 95° C. to about 150° C. and preferably from about 130° C. to about 140° C. The time of heating varies depending upon the reactants and the heating temperature, but is generally between about 4 to 16 hours. Reaction times and temperatures which provide a high conversion of amine to amide are preferred. Preferably, the secondary amine is present in an amount sufficient to provide a 5 to 10 mole percent molar excess, relative to the fatty acids which make up the triglycerides initially present in the fats or oils. The glycerides present in the resultant reaction mixture are mixtures of monoglycerides, diglycerides and triglycerides. While the mono- and diglycerides are formed during the reaction, the triglycerides are believed to be unreacted fats or oils.

A wide variety of fats and oils can be used to prepare the instant surfactant composition. Chemically, fats and oils are carboxylic esters derived from glycerol, $HOCH_2CHOHCH_2OH$, and are known as triglycerides. More specifically, they are triacylglycerols. As the following formula shows, each fat or oil is made up of triglycerides derived from carboxylic acids. The carboxylic acids may be the same or different, that is, R, $R^1$ and $R^2$ are alkyl groups that may be the same or different.

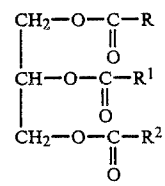

The proportions of the various acids vary from fat to fat; each fat has its characteristic composition, which does not differ significantly from sample to sample. Preferably the fats and oils used in the present invention are triglycerides of fatty acids with 12 to 24 carbon atoms. As the terms are commonly used, a fat is a triglyceride which is a solid at room temperature and an oil is a triglyceride which is a liquid.

Suitable fats and oils include: Babassu, butterfat, castor, cocoa butter, coconut, corn, cottonseed, herring, lard, linseed, menhaden, mustard seed (Montana), neatsfoot, oiticica, olive, palm, palm kernel, peanut, perilla, rapeseed (Montana), rice bran, safflower, sardine, sesame, soybean, sunflower, tallow, tung, whale and mixtures thereof.

A preferred fat for use in the present invention is tallow (animal fat) because of its low cost. Tallow designates the fat from the fatty tissue of animals such as pigs, cattle and sheep. Oleo stock is the highest grade of beef tallow. It contains (as triglycerides): Oleic acid (37–43%), palmitic acid (24–32%), stearic acid (20–25%), myristic acid (3–6%), and linoleic acid (12–3%). Minor constituents are cholesterol, arachidonic, elaidic, and vaccenic acids.

Any secondary amine which can react at a reasonable rate with a fat or oil to form amides and glycerides (mixtures of mono-, di-, and triglycerides) is suitable for use in the practice of the present invention. Suitable amines include saturated aliphatic secondary amines having two to eight carbon atoms, such as dimethylamine, diethylamine, dipropylamine, dibutylamine; and saturated aliphatic hydroxyl-containing secondary amines having two to eight carbon atoms, such as diethanolamine, dipropanolamine, dibutanolamine, methylethanolamine and mixtures thereof. A preferred secondary amine is diethanolamine.

The amides and glycerides which comprise the surfactant preferably have low Hydrophile-Lipophile Balance (HLB). The HLB is an expression of the size and strength of the hydrophilic (water-loving or polar) and lipophilic (oil-loving or non-polar) groups of the surfactant. A surfactant that is lipophilic in character is assigned a low HLB number (below 9.0). Preferably the glycerides have an HLB from about 0.5 to about 6, and the amides have an HLB from about 3 to about 5.

Carriers useful in forming the instant composition should be insoluble in the liquid which is to be decontaminated. This is necessary because if the carrier were soluble in that liquid it would merely dissolve and would not effect agglomeration. Additionally a useful carrier should form a solution with the surfactant.

Suitable carriers include alkanolamines with 2 to 8 carbons, alcohols with 6 to 24 carbons, fatty acids with 12 to 24 carbons, straight chain-, branched-, and cyclo-aliphatic hydrocarbons with 8 to 20 carbons, aromatic hydrocarbons such as substituted or unsubstituted benzene and naphthalene (substituents, if present can include straight chain-, branched-, and cyclo-aliphatics with 1 to 20 carbons) and mixtures thereof. It is contemplated that these carriers can contain minor amounts of impurities, as are normally found in such compositions. In order to provide surfactant solubility, a polar carrier (e.g. an alcohol with 6 to 24 carbons) is useful in carrier mixtures. Indeed such alcohols alone are functional carriers. However, because other carriers, such as aromatic and aliphatic hydrocarbons, are typically less expensive than such alcohols, it is more economical to use a mixture.

A preferred carrier comprises from about 20 to about 100 weight percent capryl alcohol or 2-ethylhexanol and 0 to about 80 weight percent heavy aromatic naphtha, where the weight percent is relative to the total weight of the carrier. Heavy aromatic naphtha, also known as heavy naphtha or crude heavy solvent naphtha, is a primarily aromatic solvent derived from coal tar by fractional distillation. One example of heavy aromatic naphtha is available from Exxon under the trademark HAN and comprises about 80 to 95% aromatics, 1 to 2% olefins and the remainder saturates. Typically it begins boiling at 176.7° C., 50% of the liquid boils off at 223.3° C. and all the liquid boils off at 276.7° C.

Additives may also be included in minor amounts in the present composition. Anti-oxidants (e.g. hindered phenols such as 2,5 ditertiarybutylphenol), light stabilizers and/or other preservatives (e.g. hydroquinones) are examples of typical additives which can be advantageously used.

The agglomerating process by which well fluids are decontaminated can be practiced in the equipment usually found on drilling rigs. Suitable equipment includes a mixing vessel of adequate size, a mixing unit such as an impellar type or a centrifugal recirculating loop and means to separate the agglomerated solids from the clear well fluid. The means by which the agglomerates are separated from the clear fluid can be any that is convenient, such as skimming, decanting or filtering.

The solids-contaminated well fluid is placed into a suitable container which can be exposed to air or sealed, as desired. A mixer can be provided so that the materials used in the present process can be thoroughly mixed with the well fluid. In addition, the container is provided with a suitable means to remove the agglomerated solids from the liquid phase. Agglomerated solids can be removed by any convenient means, such as a rotary sweeper, to remove the solids over an inclined discharge ramp such as used in air flotation cells. Alternatively, the container can be provided with adjustable liquid draw pipes so that the solids-free well fluid can be decanted away from the removed solids. If desired, the container can be provided with both a sweeper and decanting mechanism for separating the solid and the liquid phases. Yet another option is to remove the agglomerated solids by passing the well fluid through a filter system.

Contaminants commonly include solids such as sand, formation particles and debris, pipe dope, rust, insoluble carbonates, mud solids such as barite, emulsifier, thinners, cement and other solid materials in various combinations and amounts that can be found in the well system. The process of the present invention is also suitable for removing oil that is intimately associated with solid contaminant particles. If the oil is not intimately associated with the contaminant particles because of its low density, it will usually float to the surface of the fluid and can be removed.

The contaminated well fluid is mixed with an amount of the composition of the present invention effective to cause agglomeration of solid contaminants. Preferably, the amount of the instant composition used is from about 0.5 to 10 volume percent and most preferably from about 0.5 to about 5 volume percent, relative to the volume of contaminated well fluid.

After the composition is distributed within the well fluid, it is allowed to rest. Typically, agglomeration is accomplished in less than 1 hour. The solids normally agglomerate into gel-like soft masses which float to the surface or settle to the container bottom depending upon the density of the agglomerated mass of solids. The mass of solids can then be removed from the liquid phase by a skimmer, by filtering or by decanting the clear liquid. In any event, once the liquid phase has been cleared by removing the agglomerated mass of solids, the resultant well fluid is substantially solids-free.

As stated previously, the composition of the present invention can also be used as a preflush in a well system, typically comprising well bore equipment and surface equipment. An effective amount of the surfactant/carrier composition of this invention is mixed with clean water or brine. Preferably the composition is added in an amount from about 0.5 to about 10 volume percent, and most preferably in an amount from about 0.5 to about 5 volume percent, relative to the volume of water or brine, to form a treated water mixture. The water or brine used should be "clean", that is substantially free of solid contaminants. Contaminated brine or water can first be decontaminated using the agglomeration process described above, and then used as the clean brine or water in a preflush mixture. The treated water mixture can be used in a displacement process for eliminating drilling fluid components of mud, solids and oil from a well system prior to the introduction of fresh well fluid such as solids-free brine. The drilling fluid is displaced from the well system by the treated water mixture which is circulated through the well system in order to displace drilling fluid before it. The treated water mixture removes residual drilling fluid and contaminants. After the treated water mixture is passed through the well system, the solids-free aqueous brine is introduced into the well bore system. Preferably a first portion of clean water is introduced into the well system ahead of the treated water mixture and circulated therein until most of the drilling mud is removed from the well system and carried in the first portion of clean water. A second optional portion of clean water can be introduced into the well system after the treated water mixture in order to displace the treated water mixture to a suitable disposable region, without interruption of circulation to the well system, prior to the introduction of fresh well fluid into the well system.

The treated water mixture removes substantially all of the residual drilling fluid (e.g., mud, solids and oils) from the well system. The contaminants are carried away in an agglomeration resembling gel-like soft masses of solids. The treated water effects a cleaning of the well bore equipment and removes residual drilling fluid in the well bore equipment and no significant amounts of drilling fluid constituents escape its cleaning action. No cleaning by rig work persons is required using swabs, etc. in the well bore equipment. The treated water mixture is removed from the equipment and carries away the residual drilling mud.

The following experimental results are provided for the purpose of illustration of the present invention and are not intended to limit the scope of the invention.

EXAMPLES

Amide/glyceride surfactants were prepared by heating secondary amine together with an oil or fat. The secondary amine (diethanolamine) used in the following examples was technical grade, and the grade of the fats and oils was nonedible.

Example 1

An approximately 3:1 molar ratio mixture of castor oil and diethanolamine was prepared by mixing 180 grams of caster oil with 20 grams of diethanolamine. The mixture was heated for five hours at approximately 100° C. and then cooled to room temperature. The color of the mixture was a very dark red. An infrared analysis showed that amide was present.

Example 2

An approximately 1:1 molar ratio mixture of castor oil and diethanolamine was prepared by mixing 150 grams of castor oil with 50 grams of diethanolamine. After heating for 2 hours and 15 minutes the temperature of the mixture reached 100° C. The heating was continued for an additional 5 hours and 35 minutes, during which time the temperature varied from 95° C. to 110° C. The mixture color was a very dark red.

Example 3

A mixture of soybean oil (150 grams) and diethanolamine (60 grams) was prepared. Upon heating, the mixture temperature rose from 90° C. after 25 minutes, to 130° C. after 5 hours and 20 minutes of heating the first day. The mixture was orange in color and opaque. After about 15 hours and 35 minutes, the heating continued the next day for 7 hours and 10 minutes, by which time the mixture had reached a temperature of 148° C. and was very dark red in color. This mixture was analyzed for amide and glyceride content as described in Example 8.

Example 4

A mixture of Arista Vegetable Oil Residue (360 grams) and diethanolamine (120 grams) was prepared. This mixture was heated for 3 hours and 35 minutes the first day. During that time, the temperature reached 108° C. after 20 minutes of heating, 140° C. after 1 hour and 25 minutes, and 138° C. when the heat was turned off after a total heating time of 3 hours and 35 minutes. After cooling for 15 hours and 35 minutes, heating resumed for 4 hours and 35 minutes the second day. During the second day, the temperature varied from 123° C. after 65 minutes to 150° C. after 2 hours and 55 minutes to 143° C. after 4 hours and 35 minutes. From the total mixture, 107.7 grams of this composition was removed and set aside for amide/glyceride analysis as described in Example 8.

Example 5

The remainder of the mixture from Example 4 (i.e., the remaining 372.3 grams) was mixed with an additional 29 grams of diethanolamine. The mixture, which was still warm (135° C.) was reheated for an additional 3 hours and 35 minutes, reaching a temperature of 145° C. It was allowed to cool for 15 hours and 15 minutes overnight and then heated for 8 hours and 35 minutes the following day, at which time it reached a temperature of 150° C.

Example 6

A mixture of pig tallow (330 grams) and diethanolamine (110 grams) was heated to temperatures ranging from about 100° C. after 1 hour and 45 minutes to 135° C. after 4 hours and 45 minutes to 132° C. after 8 hours and 55 minutes the first day. It was then allowed to cool for 15 hours and 40 minutes, then heated for 20 minutes (to 60° C.) the second day. Then 109 grams of the composition was removed and set aside as Example 6.

Example 7

The remainder of the mixture from Example 6 (i.e., the remaining 331 grams) was mixed with an additional 27 grams of diethanolamine. This new mixture was then heated for an additional 5 hours and 20 minutes, when it reached a temperature of 140° C.

Example 8

The compositions that were made in Examples 3 and 4 were analyzed in order to determine the amide content and the amide/glyceride ratio of each. This analysis was performed using a single reflection internal reflectance prism liquid cell and a Nicolet fourier transform infrared spectrometer. A fourier transform infrared (FTIR) spectrometer is an instrument used to obtain infrared spectrum of infrared-absorbing materials. Nicolet is a well known manufacturer of FTIR spectrometers.

The sampling apparatus is a single reflection internal reflectance zinc selenide prism liquid cell made by Harrick Scientific. This cell provides constant pathlength, which is important in quantitation using infrared spectroscopy. With constant pathlength, absorbance is directly proportional to concentration.

In this analysis, Schercomid SLE was used as a calibration standard. The amide content of Schercomid SLE was set to 100% so that all the percentages generated would be normalized to Schercomid SLE. Schercomid SLE is the reaction product of an amine and a fatty methyl ester which is nearly 100% amide. The percent amide was calculated by dividing the absolute absorbance of the sample's amide band by the absolute absorbance of the Schercomid SLE's amide band then multiplying by 100.

The absolute absorbance of the amide band was calculated by choosing two appropriate baseline points on either side of the amide band, generating a baseline between these two points, and subtracting the deviation from zero of this generated baseline from the peak absorbance of the amide band.

The amide/glyceride ration was obtained by dividing the absolute absorbance of the sample spectrum's amide band by the absolute absorbance of its ester band.

| Surfactant Sample | % Amide | Amide/Glyceride Ratio |
|---|---|---|
| Example 3 | 80.8 | 4.6 |
| Example 4 | 43.9 | 3.9 |

The high conversion rate to amide is unexpected. The Example 3 sample resulted from a reaction of soybean oil with a molar excess of diethanolamine, therefore, the theoretical limit for conversion to amide is 100%. The sample from Example 4 contained only enough diethanolamine to reach a 50% theoretical conversion limit.

Example 9

In order to determine the effectiveness of compositions of the present invention when used to clarify aqueous brine solutions, comparisons were made between a control which contained no agglomeration agent, a commercially available product and a coposition of the present invention. The commercially available product was analyzed by Fourier Transform infrared spectral interpretation, gas chromotography and physical methods, and was found to comprise:

38 weight percent 2-ethylhexanol;
24.8 weight percent linoleic acid diethanolamine salt; and
37.2 weight percent diethanol linoleamide. The composition of the present invention comprises:
38 weight percent tallow diethanolamide/glyceride;
31 weight percent heavy aromatic naphtha; and
31 weight percent 2-ethylhexanol. The tallow diethanolamide/glyceride is synthesized from tallow (animal fat) and diethanolamine as described in Example 7.

The Example 9 comparison was performed as follows:

(1) the brine was continuously stirred with a propeller stirrer;

(2) 100 cc of the brine were poured into a prescription bottle;

(3) the composition to be compared was added in the appropriate volume percent;

(4) the bottle was shaken for 2 minutes at low speed;

(5) the bottle was placed in a water bath at 54.4° C. for 1 hour;

(6) 30 cc of the mixture were drawn off carefully from the bottle with a hypodermic syringe. Care was taken not to remove any agglomerates formed;

(7) the turbidity was measured on a HACH Turbidimeter. The turbidimeter operates on the nephelometric principle by measuring light scattered at 90 degrees from a directed beam by particles in the sample. The turbidimeter reads directly in Nephelometric Turbidity Units (NTU), with a high NTU reading indicating a high amount of light scattering and correspondingly a high amount of particulate matter present in the sample.

The brine used in Example 9 was a 14.2 pounds per gallon CaBr2 field brine. The compositions performed as follows:

| Sample | Dosage, Volume Percent | Turbidity After 1 Hr. at 54.4° C. (NTU) |
|---|---|---|
| Control | 0 | 18.5 |
| Example 9 Composition | 0.5 | 11.0 |
| Example 9 Composition | 1.0 | 9.0 |
| Example 9 Composition | 2.0 | 7.0 |
| Example 9 Composition | 5.0 | 7.0 |
| Prior Art Composition | 0.5 | 32.0 |
| Prior Art Composition | 1.0 | 34.0 |
| Prior Art Composition | 2.0 | 38.0 |
| Prior Art Composition | 5.0 | 40.0 |

The data in the above Table shows that the composition of the present invention is much more effective at clarifying aqueous brines than both the control and a commercially available product which was analyzed to be similar to that disclosed in U.S. Pat. No. 4,515,699 issued May 7, 1985 to Oliver, Jr. et al. and U.S. Pat. No. 4,456,537 issued June 26, 1984 to Oliver, Jr. et al. It can be seen from the above Table that the commercial product actually disperses the contaminants and thereby produces results worse than the control, that is, when no agglomeration agent at all was present.

Example 10

This comparison was performed as in Example 9 except another composition of the present invention was used, a different brine was used and the samples were not heated.

The composition of the present invention comprises:
38 weight percent tallow diethanolamide/glyceride;
31 weight percent heavy aromatic naphtha; and
31 weight percent capryl alcohol The brine was a 14.2 pounds per gallon $CaBr_2/ZnBr_2$ field brine.

The comparison samples were not heated, as they were in step 5 of Example 9. Instead they were left at ambient temperatures for 24 hours.

| Sample | Dosage, Volume Percent | Turbidity After 24 Hrs. at Ambient Temperatures (NTU) |
|---|---|---|
| Control | 0 | 92 |
| Example 10 Composition | 0.5 | 74 |
| Example 10 Composition | 1.0 | 36 |
| Example 10 Composition | 1.5 | 12 |
| Prior Art Composition | 0.5 | 70 |
| Prior Art Composition | 1.0 | 65 |
| Prior Art Composition | 1.5 | 30 |

The above Table demonstrates the improved effectiveness of the composition of the present invention. Although the prior art composition was marginally better at 0.5 volume percent the turbidity was still 70 NTU. A turbidity of somewhat less than 15 NTU must be achieved before a brine is considered clarified.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

We claim:

1. A composition useful for agglomerating solid contaminants in a well fluid comprising:
   (a) at least about 10 percent by weight, relative to the total composition weight, of a surfactant comprising amides and glycerides formed by contacting one or more secondary amines selected from the group consisting of Alkyl secondary amines having from 2 to 8 carbon atoms, saturated aliphatic hydroxyl-containing secondary amines having from 2 to 8 carbon atoms, and mixtures thereof with triglyceride fats, triglyceride oils or mixtures thereof; and
   (b) a carrier capable of forming a solution with said surfactant and which is substantially insoluble in said well fluid and is selected from the group consisting of alkanolamines having from 2 to 8 carbons, alcohols having from 6 to 24 carbons, fatty acids having 12 to 24 carbons, aliphatic hydrocarbons selected from the group consisting of straight chain hydrocarbons, branched hydrocarbons and cycloaliphatic hydrocarbons having 8 to 20 carbons, aromatic hydrocarbons selected from the group consisting of substituted and unsubstituted benzenes and napthalenes and mixtures thereof.

2. The composition of claim 1 wherein said secondary amine is selected from the group consisting of dimethylamine, diethylamine, dipropylamine, dibutylamine, diethanolamine, dipropanolamine, dibutanolamine, methylethanolamine and mixtures thereof.

3. The composition of claim 1 wherein said secondary amine is diethanolamine.

4. The composition of claim 1 wherein said fats or oils are triglycerides of carboxylic acids having 12 to 24 carbon atoms.

5. The composition of claim 1 wherein said fats or oils are selected from the group consisting of castor, lard, soybean, tallow, tung, and mixtures thereof.

6. The composition of claim 1 wherein the carrier comprises an alcohol present in an amount ranging from about 20 to 100 weight percent, relative to the total carrier weight.

7. The composition of claim 1 wherein the carrier comprises 2-ethylhexanol present in an amount ranging from about 20 to 100 weight percent, relative to the total carrier weight.

8. The composition of claim 1 wherein the carrier comprises capryl alcohol present in an amount ranging from about 20 to 100 weight percent, relative to the total carrier weight.

9. The composition of claim 1 wherein the carrier is a mixture of an alcohol and heavy aromatic naphtha.

10. The composition of claim 1 wherein said amides and glycerides are formed by contacting said one or more secondary amines with said fats, oils or mixtures thereof at temperatures ranging from about 95° C. to about 150° C.

11. The composition of claim 1 wherein the surfactant is present in an amount ranging from about 10 to about 50 percent by weight, relative to the total composition weight.

12. The composition of claim 1 wherein the surfactant is present in an amount ranging from about 20 to about 50 percent by weight, relative to the total composition weight.

13. The composition of claim 1 wherein the surfactant is present in an amount ranging from about 35 to about 45 percent by weight, relative to the total composition weight.

14. The composition of claim 1 wherein said surfactant is present in an amount ranging from about 20 to about 50 percent by weight and said carrier is present in an amount ranging from about 50 to about 80 percent by weight, relative to the total composition weight.

15. The composition of claim 1 wherein said composition comprises:
   (a) from about 35 to about 45 weight percent surfactant comprising amides and glycerides formed by contacting diethanolamine with tallow; and
   (b) a carrier comprising from about 20 to about 40 weight percent 2-ethylhexanol or capryl alcohol and about 20 to about 40 weight percent heavy aromatic naphtha, wherein said weight percents are relative to the total composition weight.

16. A process for removing solid contaminants from a well fluid comprising:
   (a) adding the composition of claim 1 to a well fluid containing solid contaminants,
   (b) allowing a substantial amount of the contaminants to agglomerate, and (c) separating the agglomerates from the well fluid.

17. The process of claim 16 wherein said composition is present in the amount from about 0.5 to about 5 volume percent based on the volume of the well fluid.

18. In a process for eliminating drilling mud solids and oil from a well system comprising well bore equipment and surface equipment prior to introduction of a fresh well fluid in which the process comprises:
 (a) displacing drilling mud from the well system by circulation therein of a first portion of clean water until most of the drilling mud is removed from the well system;
 (b) circulating a treated water mixture comprising an agglomerating composition and a second portion of clean water or brine through the surface equipment and the well bore equipment of the well system to displace therefrom the first portion of the clean water carrying drilling mud;
 (c) circulating the treated water mixture in the well system in which the fresh well fluid is to be introduced until substantially all the drilling mud is suspended in the circulated treated water mixture; and
 (d) displacing the treated water mixture with fresh well fluid in the parts of the well system receiving the fresh well fluid;
 wherein the improvement comprises circulating a treated water mixture containing an agglomerating composition comprising:
  (i) at least about 10 percent by weight, relative to the total composition weight, of a surfactant comprising amides and glycerides formed by contacting one or more secondary amines selected from the group consisting of alkyl secondary amines having from 2 to 8 carbon atoms, saturated aliphatic hydroxyl-containing secondary amines having from 2 to 8 carbon atoms, and mixtures thereof with triglyceride fats, triglyceride oils or mixtures thereof; and
  (ii) a carrier capable of forming a solution with said surfactant and which is substantially insoluble in said well fluid and is selected from the group consisting of alkanolamines having from 2 to 8 carbons, alcohols having from 6 to 24 carbons, fatty acids having 12 to 24 carbons, aliphatic hydrocarbons selected from the group consisting of straight chain hydrocarbons, branched hydrocarbons and cyclo-aliphatic hydrocarbons having 8 to 20 carbons, aromatic hydrocarbons selected from the group consisting of substituted and unsubstituted benzenes and napthalenes and mixtures thereof.

19. The process of claim 18 wherein the treated water mixture is displaced to a suitable disposal region without interruption of circulation to the well system by a third portion of clean water prior to the introduction of the fresh well fluid.

20. The process of claim 18 wherein the agglomerating composition is present in the amount of from about 0.5 to about 5 volume percent based on the volume of the second portion of clean water or brine.

21. The process of claim 18 wherein the fresh well fluid is an aqueous brine.

22. The process of claim 18 wherein the fresh well fluid is a cement slurry.

* * * * *

UNITED STATES PATENT AND TRADEMARK OFFICE
CERTIFICATE OF CORRECTION

PATENT NO. : 4,796,703
DATED : January 10, 1989
INVENTOR(S) : Robert K. Gabel and Robert E. Law It is certified that error appears in the above—identified patent and that said Letters Patent is hereby corrected as shown below:

Column 1, line 8, delete the first occurrence of "an" and substitute therefor --as--.

Column 8, line 1, delete "caster" and substitute therefor --castor--.

Column 9, line 42, delete "ration" and substitute therefor --ratio--.

Column 9, line 64, delete "coposition" and substitute therefor --composition--.

Column 10, line 35, delete "CaBr2" and substitute therefor --$CaBr_2$--.

Column 11, line 53, delete "Alkyl" and substitute therefor --alkyl--.

Signed and Sealed this

Second Day of May, 1989

*Attest:*

DONALD J. QUIGG

*Attesting Officer*   *Commissioner of Patents and Trademarks*